(No Model.)

C. H. SMITH.
HAME FASTENER.

No. 447,587. Patented Mar. 3, 1891.

Witnesses.
J. N. Shumway
L. D. Kelsey

Charles H. Smith,
Inventor
By attys
Earle & Seymour

UNITED STATES PATENT OFFICE.

CHARLES H. SMITH, OF NEW HAVEN, CONNECTICUT, ASSIGNOR TO O. B. NORTH & COMPANY, OF SAME PLACE.

HAME-FASTENER.

SPECIFICATION forming part of Letters Patent No. 447,587, dated March 3, 1891.

Application filed January 5, 1891. Serial No. 376,745. (No model.)

*To all whom it may concern:*

Be it known that I, CHARLES H. SMITH, of New Haven, in the county of New Haven and State of Connecticut, have invented a new Improvement in Hame-Fasteners; and I do hereby declare the following, when taken in connection with accompanying drawings and the letters of reference marked thereon, to be a full, clear, and exact description of the same, and which said drawings constitute part of this specification, and represent, in—

Figure 1:
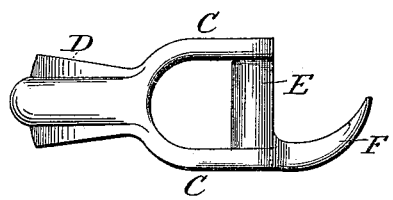
Figure 2:
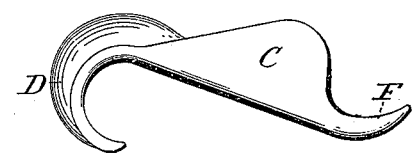
Figure 3:
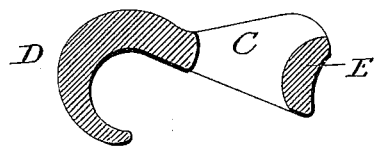
Figure 4:
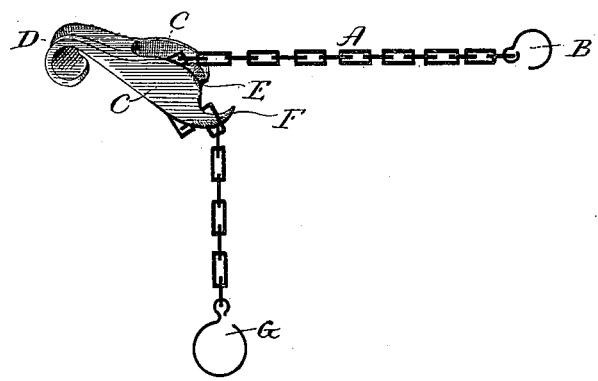

Figure 1, a top or plan view of the fastener; Fig. 2, a side view of the same; Fig. 3, a longitudinal central section; Fig. 4, a perspective view of the fastener with the chain attached.

This invention relates to the construction of a device for securing the hames of a harness, the object being a simple device, so that the engagement of the hames may be made with great facility, be secure when fastened, and not liable to accidental detachment, but easily detached when desired; and the invention consists in the construction as hereinafter described, and particularly recited in the claim.

A chain A is secured to one of the hames, as by a clip B.

My improved fastening device consists of a frame composed of two sides C C, connected at one end by a hook or clip D, by which the fastening device may be attached to the other hame. At the other end of the frame the two sides are connected by a cross-bar E, and from one of the sides a curved finger F projects in substantially a longitudinal direction. This finger is curved, and preferably reduced in diameter toward its end, so as to form substantially a point which may readily enter one of the links of the chain. The chain is passed through the frame over the bar, and the end of the chain is enlarged, preferably in the form of a hook G, so as to prevent the fastener from slipping entirely from the chain.

In use the hook of the fastener is preferably adapted to be detached from the hame to which it is to be secured, and so detached the hame is placed upon the collar with the chain free. Then the hook D is engaged with the other hame and the chain drawn over the bar E to the required tension. Then a corresponding link of the chain is passed onto the finger F, as represented in Fig. 4, which holds the chain and prevents the separation of the hames until the chain be disengaged from the finger.

To remove the hames, the chain is disengaged from the finger F and so as to permit the fastener to be detached from the hame. The fastener then slides on the chain until the stop at the end is reached, and there hangs until required for further use.

Instead of making the fastener detachable from the hame, the hook D may serve as a clip to close around the loop of the hame to which it is to be attached, so that it will be permanently hung thereto. In this case the chain should be adapted to slip through the fastener, so as to separate the chain from the fastener and permit the removal of the hames.

The chain may be any of the common metal chains, having links of suitable lengths for the proper adjustment.

The fastener is best made from malleable iron or other suitable cast metal, as it may be readily molded and cast complete. It is therefore extremely cheap, durable, and makes a fastener easily adjusted and not liable to accidental disengagement.

By making the stop at the end of the chain in the form of a hook G that hook serves as a means for attaching the end of the chain to the body of the chain or some other point to prevent its swinging free.

I claim—

The herein-described hame-fastener, consisting of a frame constructed with a clip D at one end for attachment to the hame, a cross-bar E at the opposite end, and a projecting finger F at the cross-bar end, combined with a chain adapted for attachment to the other hame, the said chain passing through said frame over the cross-bar, and the said finger adapted to engage a link of the chain, substantially as described.

In testimony whereof I have signed this specification in the presence of two subscribing witnesses.

CHARLES H. SMITH.

Witnesses:
C. L. WHITNEY,
GEO. P. NORTH.